(Model.)
C. A. BUFFINGTON.
THILL COUPLING.
No. 273,808. Patented Mar. 13, 1883.
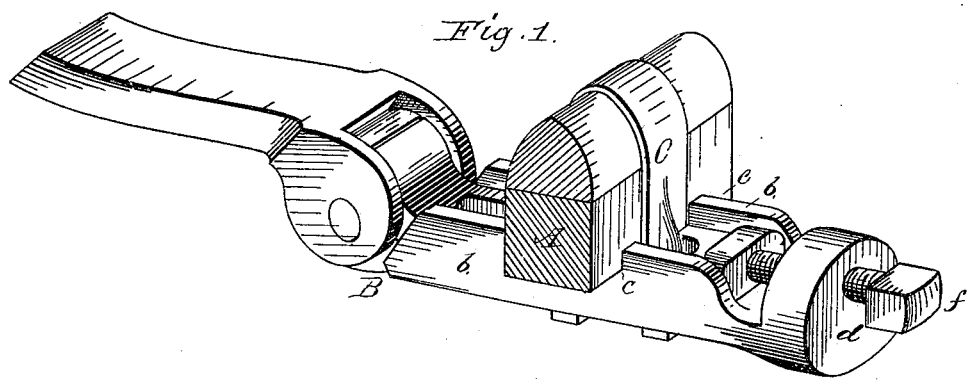
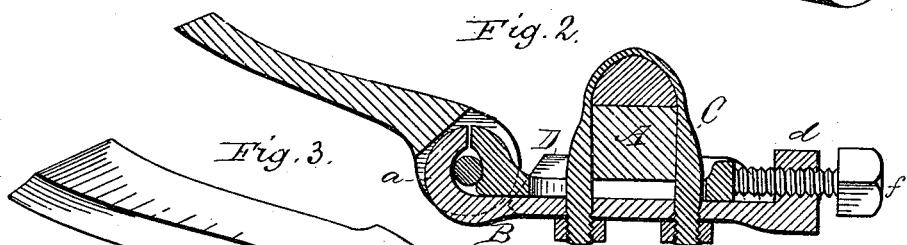
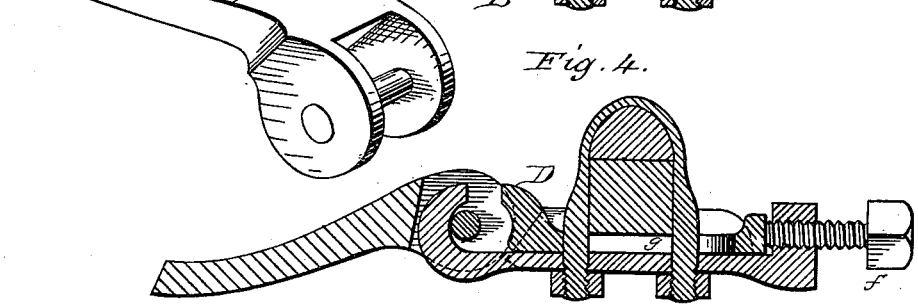
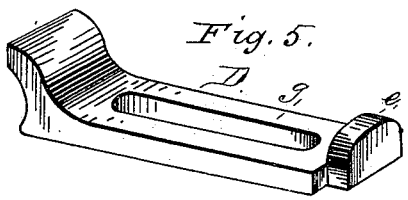
Witnesses:
C. M. Johnson
Ellis Mills
Inventor:
Calvin A. Buffington
By _____ Attorney.
N. PETERS, Photo-Lithographer, Washington, D. C.

UNITED STATES PATENT OFFICE.

CALVIN A. BUFFINGTON, OF BERKSHIRE, NEW YORK.

THILL-COUPLING.

SPECIFICATION forming part of Letters Patent No. 273,808, dated March 13, 1883.

Application filed November 27, 1882. (Model.)

*To all whom it may concern:*

Be it known that I, CALVIN A. BUFFINGTON, a citizen of the United States of America, residing at Berkshire, in the county of Tioga and State of New York, have invented certain new and useful Improvements in Thill-Couplings; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain new and useful inventions in thill-couplings, and it has for its object to provide a device whereby the shafts or pole can be readily attached and detached from the axle of the vehicle, and which will provide a means whereby the coupling can be tightened, so as to prevent rattling; and to this end my invention consists in providing the axle of a vehicle with a draw-bar having one end grooved or hooked, and in providing the other end with an upwardly-curved projecting portion, which is held in place by a set-screw; also, in providing the draw-bar with a sliding lock-plate.

My invention also consists in the construction and combination of the parts, as will be hereinafter set forth, and pointed out in the claims.

In the annexed drawings, which illustrate my invention, Figure 1 is a perspective view, showing my improved thill-coupler applied to the axle of a vehicle. Fig. 2 is a longitudinal section, showing the parts united. Fig. 4 is a similar view, showing the parts of the coupling open, or in a position to uncouple the shafts. Figs. 3 and 5 are detailed perspective views.

In the annexed drawings, A represents the front axle of a vehicle, to which the draw-bar B is secured by the clip C. This draw-bar is curved at the end which projects in front of the axle, as shown at *a*, for the reception of the transverse bar of the thill-iron, and it is provided on its side with upwardly-projecting walls *b b*, which are cut away at the center, so as to provide the recesses *c c* for the reception of the axle-iron. On the rear end of the draw-bar B is formed an upwardly-projecting shoulder, *d*, which is screw-threaded for the reception of a bolt. The bottom or under side of this draw-bar is provided with two openings, through which pass the ends of the clip on the axle, by means of which clip the bars are united to each other. The plate D, by means of which the thill-iron is held in place in the draw-bar, fits over the draw-bar and under the axle, and its forward end is curved and raised, so as to embrace the bolt by which the thills are attached to the couplings. The rear end of this plate is provided with an upwardly-extending lug or shoulder, *e*, against which the set-screw *f* in the rear end of the draw-bar abuts. This plate D is provided with a central longitudinal slot, *g*, through which the end of the clip passes, by means of which slot the plate can be slid back and forth under the axle, which is held above the plate by the side wings, *b b*. The draft-bar B is also prevented from being twisted by being let into the recesses *c c*.

When it is desirable to fasten the thill-irons to the coupling the set-screw in the rear of the draw-bar is loosened, thus allowing the plate to be slid back, so as to open the jaws, so that the transverse bolt of the thill-iron can be inserted, and when in place the bolt is tightened, so as to force the sliding plate D upon the bar of the thill and hold the parts in place. By the means hereinbefore described the parts are held firmly in place and all rattling is prevented.

Having thus described my invention, what I claim as new, and desire to secure by Letters Patent, is—

1. In a thill-coupling, the slide-bar D, having slot *g*, raised end *e*, and curved front end, in combination with the draw-bar B, with curved front ends, *a*, raised and recessed sides *b*, upwardly-projecting ends *d*, set-screw *f*, and clip C, substantially as shown, and for the purpose set forth.

2. The draw-bar B, having front curved end, *a*, raised screw-threaded lug on its rear end for the reception of a set-screw, *f*, side wings, *b b*, with recesses *c c*, and perforations, in combination with the slotted locking-plate D, having raised ends, and clip C, substantially as shown, and for the purposes set forth.

In testimony whereof I affix my signature in presence of two witnesses.

CALVIN ALLEN BUFFINGTON.

Witnesses:
STEPHEN DARBONNIER,
C. J. DEWEY.